(12) United States Patent
Casey

(10) Patent No.: US 11,256,291 B2
(45) Date of Patent: Feb. 22, 2022

(54) SCREENED DEVICE STAND

(71) Applicant: Adam Lee Casey, Chicago, IL (US)

(72) Inventor: Adam Lee Casey, Chicago, IL (US)

( * ) Notice: Subject to any disclaimer, the term of this patent is extended or adjusted under 35 U.S.C. 154(b) by 0 days.

(21) Appl. No.: 17/000,501

(22) Filed: Aug. 24, 2020

(65) Prior Publication Data

US 2020/0387193 A1 Dec. 10, 2020

Related U.S. Application Data

(63) Continuation-in-part of application No. 16/531,025, filed on Aug. 3, 2019, now Pat. No. 10,754,374.

(60) Provisional application No. 62/714,232, filed on Aug. 3, 2018.

(51) Int. Cl.
*G06F 1/16* (2006.01)
*F16C 11/04* (2006.01)
*F16M 11/04* (2006.01)
*F16M 11/10* (2006.01)

(52) U.S. Cl.
CPC .......... *G06F 1/1607* (2013.01); *F16C 11/045* (2013.01); *F16M 11/041* (2013.01); *F16M 11/10* (2013.01); *G06F 1/166* (2013.01); *F16M 2200/022* (2013.01); *F16M 2200/08* (2013.01)

(58) Field of Classification Search
CPC ....... G06F 1/1607; G06F 1/166; G06F 1/1681
See application file for complete search history.

(56) References Cited

U.S. PATENT DOCUMENTS

| | | | | |
|---|---|---|---|---|
| 4,730,364 A | * | 3/1988 | Tat-Kee | E05D 11/1064 16/337 |
| 5,109,573 A | * | 5/1992 | Sherman | E05C 17/025 16/341 |
| 5,710,415 A | * | 1/1998 | Kono | G07G 1/12 235/7 R |
| 7,841,575 B1 | * | 11/2010 | Sliger | F16M 13/02 248/454 |
| 8,231,099 B2 | * | 7/2012 | Chen | F16M 11/10 248/688 |
| 8,243,432 B2 | * | 8/2012 | Duan | H05K 5/0234 361/679.3 |
| D667,012 S | * | 9/2012 | Chen | D14/447 |
| 8,523,124 B2 | * | 9/2013 | Yuan | G06F 1/166 248/188.8 |
| 8,616,422 B2 | * | 12/2013 | Adelman | A45F 5/02 224/191 |
| 8,767,395 B2 | * | 7/2014 | Yoo | G06F 1/1632 361/679.56 |
| 8,885,338 B1 | * | 11/2014 | Simpson | G06F 1/1626 361/679.59 |
| 8,922,995 B2 | * | 12/2014 | Su | H05K 5/0234 361/679.59 |
| 8,922,996 B2 | * | 12/2014 | Yeh | G06F 1/181 361/679.59 |
| 9,288,920 B1 | * | 3/2016 | Steiner | F16M 11/38 |
| 9,347,601 B2 | * | 5/2016 | You | F16M 11/10 |
| 9,388,939 B2 | * | 7/2016 | Girault | G06F 1/1632 |

(Continued)

*Primary Examiner* — Adrian S Wilson
(74) *Attorney, Agent, or Firm* — RC Trademark Company

(57) ABSTRACT

According to some embodiments, a removably coupled stand for a screen comprises a holder portion to removably couple a screened device and a foot portion to move from a closed position to an open position. The foot portion is hinged to the holder portion and the holder portion comprises a top side, a rear side, and a bottom side.

19 Claims, 6 Drawing Sheets

(56) References Cited

U.S. PATENT DOCUMENTS

| | | | | |
|---|---|---|---|---|
| 9,402,016 B1* | 7/2016 | Hidalgo | H04N 5/2252 |
| 9,512,655 B2* | 12/2016 | Kuo | E05D 1/04 |
| 9,720,452 B2* | 8/2017 | Lee | F16M 11/38 |
| 9,785,204 B1* | 10/2017 | Miller | H04M 1/04 |
| 9,800,703 B2* | 10/2017 | Roux | H04B 1/3888 |
| 9,995,432 B1* | 6/2018 | Girault | G06F 1/1686 |
| 10,082,727 B2* | 9/2018 | Basulto | G03B 17/563 |
| D842,851 S * | 3/2019 | Leitman | D14/253 |
| 10,309,137 B2* | 6/2019 | Wu | E05D 11/10 |
| 10,364,031 B2* | 7/2019 | Goupil | F16M 11/041 |
| 10,371,311 B2* | 8/2019 | Naylor-Warren | F16M 11/38 |
| D889,528 S * | 7/2020 | Kowalski | D16/242 |
| 10,754,374 B2* | 8/2020 | Casey | F16M 11/06 |
| 10,774,978 B2* | 9/2020 | Somoano | H04M 1/04 |
| 11,115,584 B2* | 9/2021 | Auger | G06F 1/1632 |
| 2005/0253040 A1* | 11/2005 | Yang | F16M 11/10 248/688 |
| 2006/0237623 A1* | 10/2006 | Sung | F16M 11/10 248/688 |
| 2008/0142659 A1* | 6/2008 | Sun | F16M 11/24 248/226.11 |
| 2010/0072334 A1* | 3/2010 | Le Gette | F16M 11/10 248/176.3 |
| 2010/0090085 A1* | 4/2010 | Corrion | F16M 11/38 248/459 |
| 2011/0031287 A1* | 2/2011 | Gette | F16M 11/04 224/101 |
| 2011/0069947 A1* | 3/2011 | Orf | F16M 13/00 396/419 |
| 2012/0074286 A1* | 3/2012 | Chou | F16M 13/00 248/346.03 |
| 2012/0188699 A1* | 7/2012 | Sun | G06F 1/1616 361/679.26 |
| 2013/0161967 A1* | 6/2013 | Jarrett | F16M 11/041 294/142 |
| 2013/0243231 A1* | 9/2013 | Gimeno | F16M 13/00 381/332 |
| 2013/0249227 A1* | 9/2013 | Lin | F16M 13/00 294/142 |
| 2014/0166832 A1* | 6/2014 | Briant | A45F 5/10 248/205.1 |
| 2015/0009672 A1* | 1/2015 | Girault | A45F 5/00 362/253 |
| 2015/0244126 A1* | 8/2015 | Carnevali | H04M 1/04 439/527 |
| 2015/0300050 A1* | 10/2015 | Van Balen | A47F 5/0087 248/551 |
| 2015/0365121 A1* | 12/2015 | Smith | G06F 1/1626 455/575.8 |

* cited by examiner

600

SCREENED DEVICE STAND

BACKGROUND

Screened devices, such as, but not limited to, laptop computers often include a screen that can serve as a tablet computer once the screen is detached from the laptop or have screens that rotate up to 180 degrees. These screen/tablet computers may be cumbersome to hold and support. It would therefore be desirable to have a stand that can easily hold and adjust a larger sized tablet computer, phones and smaller sized tablets.

SUMMARY

Some embodiments described herein relate to a removable stand for a screened device that comprises a holder portion to removably couple the screened device and a foot portion that moves from a closed position to an open position. The foot portion is hinged to the holder portion and the holder portion comprises a top side, a rear side, and a bottom side.

DETAILED DESCRIPTION

In the following detailed description, numerous specific details are set forth in order to provide a thorough understanding of the embodiments. However, it will be understood by those of ordinary skill in the art that the embodiments may be practiced without these specific details. In other instances, well-known methods, procedures, and components have not been described in detail so as not to obscure the embodiments.

The present embodiments described herein relate to a stand that allows for screened devices, such as, but not limited to, tablet computers, laptops, mobile phones or other portable electronic devices comprising a screen, to be better supported than what is currently available on the device and/or adds new functionality to the screened device by allowing it to be used in ways that it currently is not able to be.

The embodiments described herein relate to a stand that may be incorporated onto a screened device without interfering with its ability to perform all of its functions. Current support stands often span the entire distance (e.g., length or height) of the device which can impede its ability to utilize all aspects of the device. Unlike conventional designs, the embodiments described herein only require a very minimal amount space on each side of the device, thus not interfering with the device's ability to be fully utilized. The stand may be attached to one or both sides of a device. Moreover, the embodiments described herein relate to a removably coupled stand that can be moved up or down a screen to adjust for a specific viewing angle without leaving a glue residue like conventional stands.

Figure 1:
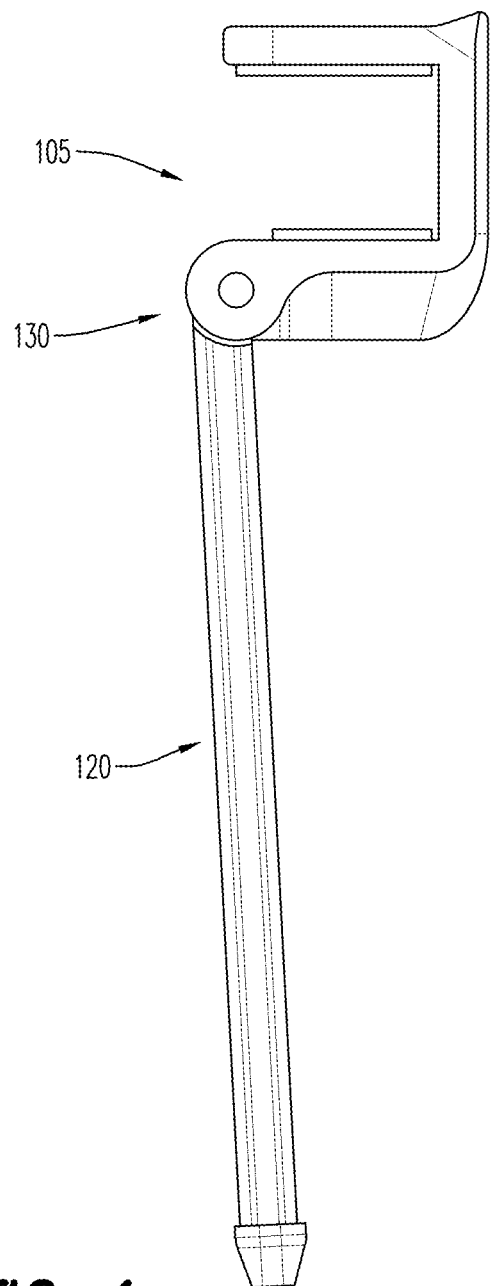
FIG. 1 illustrates a removable stand in accordance with some embodiments.
Figure 2:
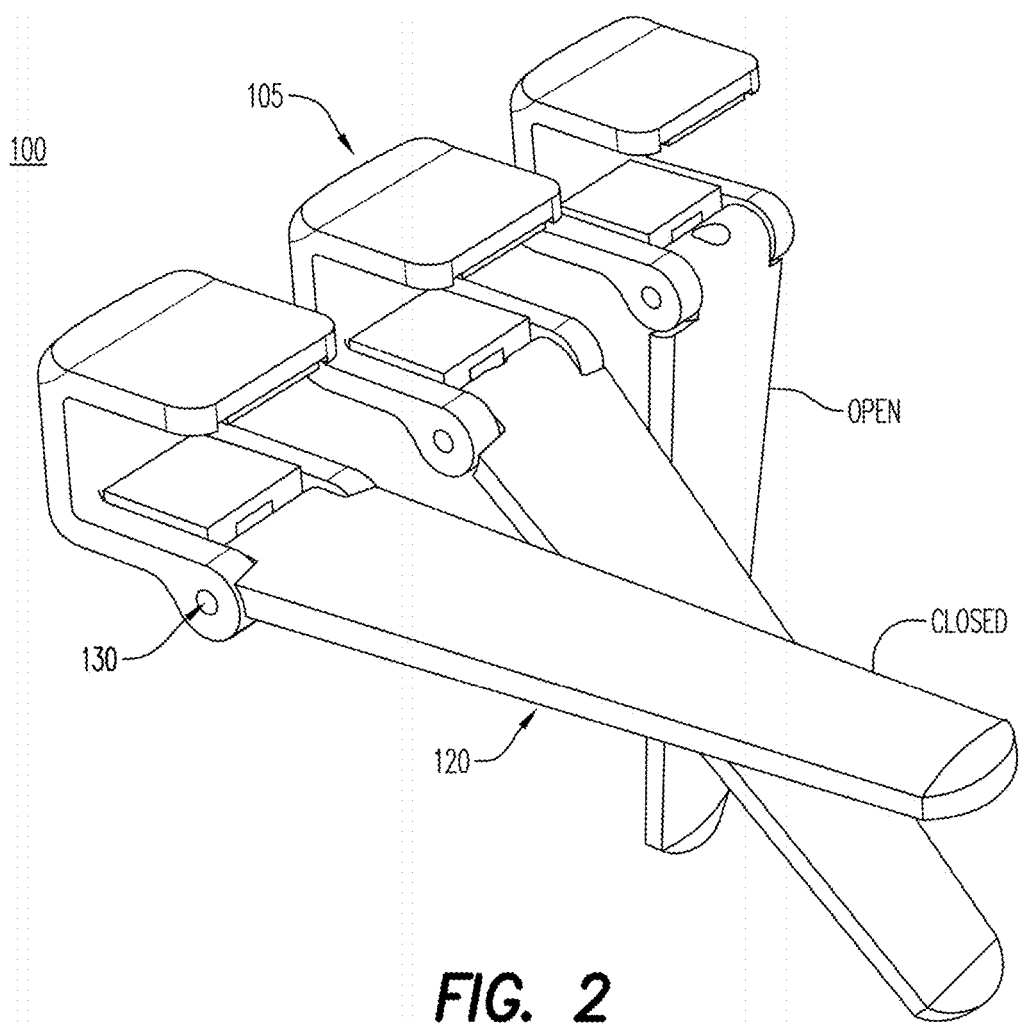
FIG. 2 illustrates a removable stand in accordance with some embodiments.

Referring now to FIG. 1, an embodiment of a stand 100 is illustrated. The stand comprises a holder portion 105 to couple a screened device, a foot portion 120 to stabilize the device being held by the holder portion 105 and a hinge 130 to couple the holder portion 105 to the foot portion 120. As illustrated in FIG. 2, the stand 100 may be set to an open position or a closed position by moving the foot portion 120 in a first direction (e.g., for the open position) and in a second direction (e.g., for the closed position). In some embodiments, multiple positions may exist between the open position and the closed position which may be used to stabilize a device based on a user's needs. After the screened device is set in the stand 100 at a desired angle or position, the stand 100 may be slid up or down on a screen associated with the device until the foot portion 120 firmly contacts a surface. When the stand 100 is fully set in place, the stand 100 may allow for the devices to be supported at various angles giving it stability and reducing associated motion. When the stand 100 no longer needs to be used, the stand 100 may be set to the closed position and placed alongside the device with the stand still attached if desired.

Figure 3:
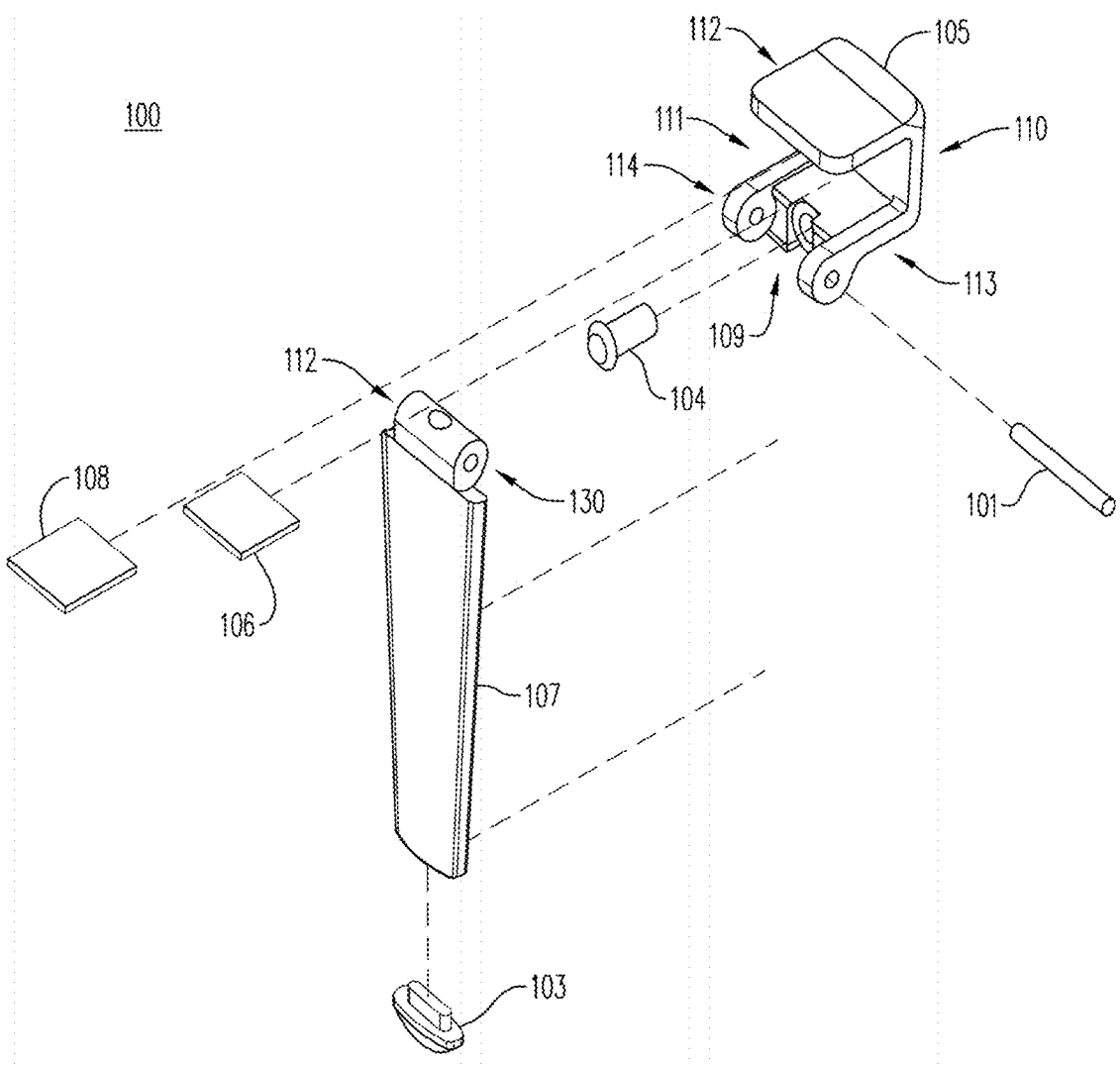
FIG. 3 illustrates a removable stand in accordance with some embodiments.

Referring now to FIG. 3, the stand 100 may comprise a head clamp 105, a leg 107, a plurality of pads 106/108, a bottom foot 103, a pin 101, and a plunger 104. The plunger 104 may be inserted into an opening 109 located inside of the head clamp 105 where the plunger 104 may be used to limit movement of the leg 107. The plunger 104 may operate in conjunction with a spring, that when compressed and then uncompressed moves the plunger in a lateral (e.g., back and forth direction). In some embodiments, instead of using a spring and plunger 104 to provide stability, some embodiments may comprise a friction pad and a physical material barrier to keep the leg 107 in a desired position as an angle and downward pressure may keep the leg 107 from moving in a wrong direction.

The bottom foot 103 may be inserted into the leg 107 at an opening at a distal end of the leg 107 (not shown in FIG. 3). In some embodiments, the leg 107 may be inserted into the foot 103. The bottom foot 103 may be comprised of a different material than the leg 107. For example, the leg 107 may be comprised of a metal and the bottom foot may be comprised of a rubber or soft plastic material.

In use, a screened device may be inserted in a head clamp opening 111 where the opening 111 is defined by a top side 112, a bottom side 113 and a rear side 110. The pads 106/108 may be coupled to the inside of the head clamp 105 to create a friction fit to secure the stand 100 to the screened device, reduce movement of the stand 100 on the screened device, and to create a surface that reduces markings on the screened device. The pads 106/107 may be comprised of a rubber or soft plastic-based material. In use, the leg 107 may be moved from a closed position to an open position by moving the leg 107 between the two positions until the plunger 104 reaches a divot 112 on the hinge 130 associated with each position. The hinge 130 may comprise a plurality of divots 112 with each divot 112 being associated with a different position to secure the leg 107. Each divot 112 may receive the plunger 104 to prevent unintended position changes. In other words, the plunger 104 may allow for greater stability while in each position and may also help to prevent unintended position changes. The stand 100 may be slid down or up a side of the screened device until the device is in its desired position and the foot 103 may be resting in direct contact with a surface. The foot 103 may be comprised of a non-slip material such as a rubber or soft plastic material to allows for reduction in movement of the device and to create a surface to reduce markings on the contacted surface. The stand 100 may be used to help support any device or other product that requires additional support/stability or where a product does not currently have any support and this function is desired.

The leg 107 may be attached to the head clamp 105 via the hinge 130 which comprises pin 101. The hinge 130 may be comprised of a first portion that is coupled to the leg 107 and the first portion comprises one or more divots 112. The hinge comprises a second portion 114 that comprise one or more knuckles to receive the pin 101. The opening 109 may be located behind the second portion 114 and on an outer edge of the holder portion 105.

Figure 4:
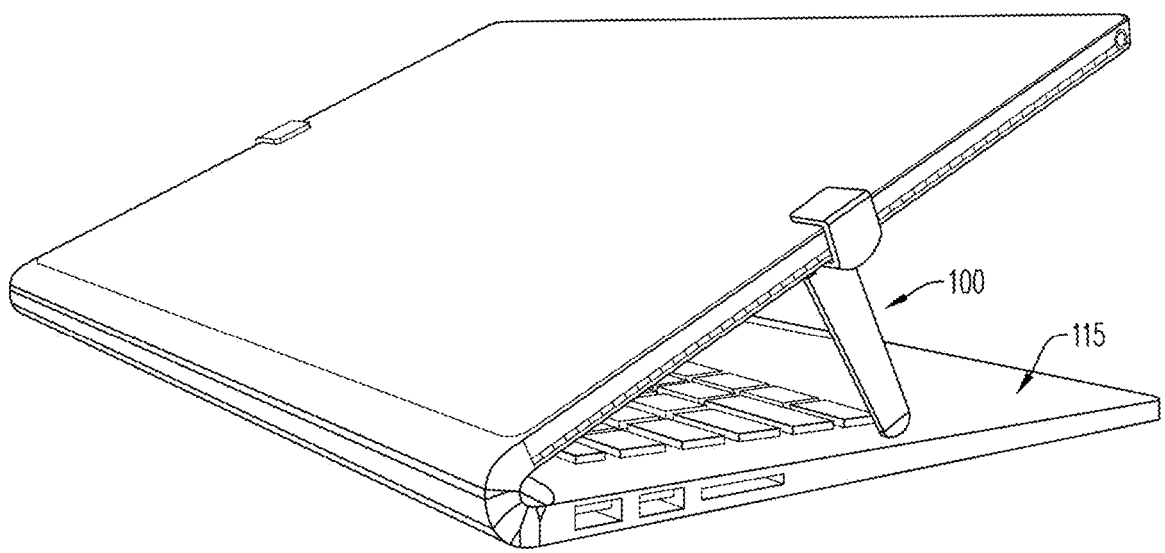
FIG. 4 illustrates a removable stand in accordance with some embodiments.

Referring now to FIG. 4, a detachable stand 100 is illustrated in an open position and supporting a screen of a screen device. As illustrated in FIG. 4, the stand 100 is detachable, movable, and may be moved into stored position when not used so that it does not interfere with other functions of the screened device. As such, the stand 100 may be moved up or down the screen to adjust for a desired viewing angle. Furthermore, as illustrated in FIG. 4, the bottom foot rests on a keyboard portion 15 of the screen device to support the screen facing away from the keyboard.

Figure 5:
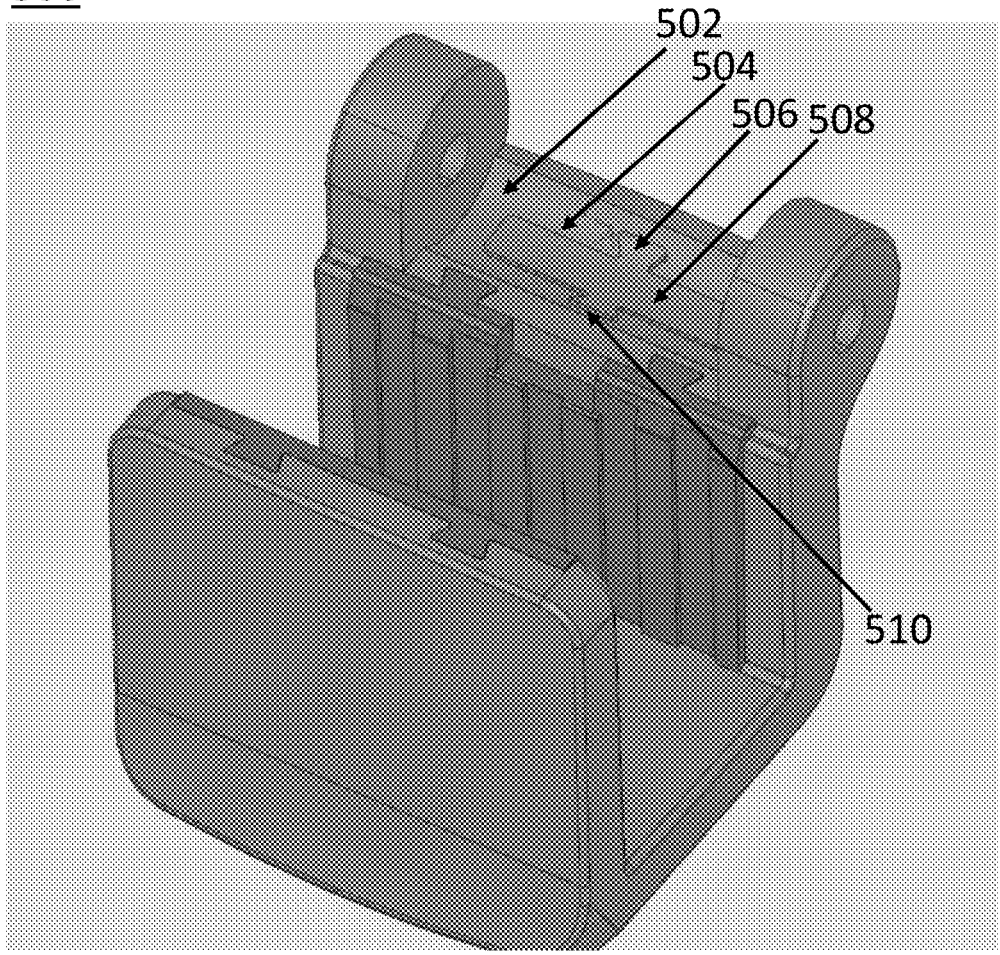
FIG. 5 illustrates a portion of a removable stand in accordance with some embodiments.

Referring now to FIG. 5, an embodiment of a head clamp 500 and hinge are illustrated. The head clamp 500 may be similar to the head clamp 105 except that the hinge portion uses a friction element associated with changing from an open position to a closed position. As illustrated in FIG. 5, a portion of the hinge serves as a curved guide portion 502 which is coupled to a bottom side of the head clamp 500 to receive the tapered foot portion wherein the curved guide portion 502 comprises a friction fit element 504. The tapered foot portion has a rounded top portion (as illustrated in FIG. 3) and the rounded top portion may be received at the curved guide portion 502. In some embodiments, the guide portion 502 may not be curved.

The friction fit element 504 may be comprised of foam or a soft plastic. In some embodiments, the friction fit element 504 may comprise a pad that is adhered to a surface of the curved guide portion 502. However, in some embodiments, the friction fit element 504 may be embedded or partially embedded into the curved guided portion 502. In some embodiments, the guide portion 502 may not be curved.

The friction fit element 504 may comprise (i) a first portion 508 that runs lengthwise along the curved guide portion 502, (ii) a second portion 506 that runs horizontally on the curved guide portion on a first side of the first portion and (iii) a third portion 510 that runs horizontally on the curved guide portion on a second side of the first portion. The first portion 508 may be substantially rectangular shaped.

Figure 6:
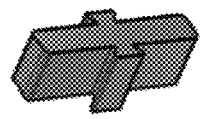
FIG. 6 illustrates a friction fit element in accordance with some embodiments.

The second portion 506 and the third portion may be substantially triangle shaped. For example, the second portion 506 may be narrower at a point where it is coupled to the first portion 508 and the second portion 506 may be wider at a distal end. Similarly, the third portion 510 may be narrower at a point where it is coupled to the first portion 508 and wider at a distal end. Referring to FIG. 6, an embodiment of a friction fit element 600 is illustrated. The friction fit element 600 may be similar to friction fit element 504 of FIG. 5.

This written description uses examples to disclose multiple embodiments, including the preferred embodiments, and also to enable any person skilled in the art to practice the invention, including making and using any devices or systems and performing any incorporated methods. Aspects from the various embodiments described, as well as other known equivalents for each such aspects, can be mixed and matched by one of ordinary skill in the art to construct additional embodiments and techniques in accordance with principles of this application.

Those in the art will appreciate that various adaptations and modifications of the above-described embodiments can be configured without departing from the scope and spirit of the claims. Therefore, it is to be understood that the claims may be practiced other than as specifically described herein.

What is claimed:

1. A removably coupled stand for a screen comprising;
   a holder portion to removably couple a screened device, the holder portion defining an opening to couple the screened device wherein the opening is defined by a top side, a rear side, and a bottom side;
   a guide portion coupled to the bottom side to receive a tapered foot portion wherein the guide portion comprises a friction fit element; and
   the tapered foot portion hinged to the holder portion, wherein the tapered foot portion comprises (i) a leg, (ii) a bottom foot and (iii) a rounded top portion to be received at the guide portion wherein the leg comprises a single piece.

2. The removably coupled stand of claim 1, wherein the holder portion comprises a first pad adhered to the top side and a second pad adhered to the bottom side to friction fit the screened device.

3. The removably coupled stand of claim 1, wherein the friction fit element is comprised of foam.

4. The removably coupled stand of claim 1, wherein the friction fit element is comprised of a soft plastic.

5. The removably coupled stand of claim 1, wherein the friction fit element is a pad.

6. The removably coupled stand of claim 1, wherein the guide portion is curved.

7. The removably coupled stand of claim 1, the friction fit element comprises (i) a first portion that runs lengthwise along the curved guide portion, (ii) a second portion that runs horizontally on the curved guide portion on a first side of the first portion and (iii) a third portion that runs horizontally on the curved guide portion on a second side of the first portion.

8. The removably coupled stand of claim 7, wherein the first portion is substantially rectangular shaped.

9. The removably coupled stand of claim 7, wherein the second portion is substantially triangle shaped.

10. The removably coupled stand of claim 7, wherein the third portion is substantially triangle shaped.

11. The removably coupled stand of claim 7, wherein the second portion is narrower at a point where it is coupled to the first portion and the second portion is wider at a distal end.

12. The removably coupled stand of claim 7, wherein the third portion is narrower at a point where it is coupled to the first portion and wider at a distal end.

13. A removably coupled stand for a screen comprising;
   a holder portion to removably couple a screened device, the holder portion defining an opening to couple the screened device wherein the opening is defined by a top side, a rear side, and a bottom side;
   a curved guide portion coupled to the bottom side to receive a tapered foot portion wherein the curved guide portion comprises a friction fit element; and
   the tapered foot portion hinged to the holder portion, wherein the tapered foot portion comprises (i) a leg, (ii)

a bottom foot and (iii) a rounded top portion to be received at the curved guide portion wherein the leg comprises a single piece.

14. The removably coupled stand of claim 13, the friction fit element comprises (i) a first portion that runs lengthwise along the curved guide portion, (ii) a second portion that runs horizontally on the curved guide portion on a first side of the first portion and (iii) a third portion that runs horizontally on the curved guide portion on a second side of the first portion.

15. The removably coupled stand of claim 13, wherein the first portion is substantially rectangular shaped.

16. The removably coupled stand of claim 13, wherein the second portion is substantially triangle shaped.

17. The removably coupled stand of claim 13, wherein the third portion is substantially triangle shaped.

18. The removably coupled stand of claim 13, wherein the second portion is narrower at a point where it is coupled to the first portion and the second portion is wider at a distal end.

19. The removably coupled stand of claim 13, wherein the third portion is narrower at a point where it is coupled to the first portion and wider at a distal end.

\* \* \* \* \*